United States Patent [19]

Tsuchiva

[11] Patent Number: 5,325,185
[45] Date of Patent: Jun. 28, 1994

[54] APPARATUS AND METHOD FOR ADJUSTING WHITE BALANCE OF A VIDEO CAMERA

[75] Inventor: Satoshi Tsuchiva, Kanagawa, Japan

[73] Assignee: Sony Corporation, Tokyo, Japan

[21] Appl. No.: 920,414

[22] Filed: Jul. 27, 1992

[30] Foreign Application Priority Data

Jul. 31, 1991 [JP] Japan .................................. 3-192158

[51] Int. Cl.$^5$ ............................................. H04N 9/73
[52] U.S. Cl. .................................... 348/223; 348/655;
348/227; 348/224
[58] Field of Search .................... 358/29 C, 29, 41, 43,
358/44, 909, 906, 228, 211; H04N 9/730 C,
5/238, 9/04

[56] References Cited

U.S. PATENT DOCUMENTS

| | | | |
|---|---|---|---|
| 4,638,350 | 1/1987 | Kato et al. | 358/29 |
| 4,646,161 | 2/1987 | Tsuchiya et al. | 358/29 |
| 4,667,224 | 5/1987 | Fujisige | 358/29 |
| 4,682,210 | 7/1987 | Ikemura et al. | 358/29 |
| 4,727,413 | 2/1988 | Miura | 358/29 |
| 4,736,241 | 4/1988 | Murakami et al. | 358/29 |
| 4,739,392 | 4/1988 | Ueda et al. | 358/29 |
| 4,774,564 | 9/1988 | Konishi | 358/29 |
| 4,827,331 | 5/1989 | Nakamura et al. | 358/29 |
| 4,883,360 | 11/1989 | Kawada et al. | 356/402 |
| 4,911,552 | 3/1990 | Kurashige et al. | 358/41 |
| 4,998,162 | 3/1991 | Kondo | 358/41 |
| 5,016,093 | 5/1991 | Yoshida | 358/41 |
| 5,019,894 | 5/1991 | Hieda | 358/29 |
| 5,038,205 | 8/1991 | Kondo et al. | 358/29 |
| 5,045,928 | 9/1991 | Takaiwa | 358/29 C |
| 5,093,716 | 3/1992 | Kondo et al. | 358/41 |

OTHER PUBLICATIONS

"Auto White Balance", Part V, Camcorder '89, JEI, Dempa Publ., Inc. pp. 50–51, Tokyo, Japan.

Primary Examiner—James J. Groody
Assistant Examiner—Sherrie Hsia
Attorney, Agent, or Firm—Robert P. Biddle; Jerry A. Miller

[57] ABSTRACT

A white balance adjustment circuit in which red, green and blue video signals representative of a video image are passed through red, green and blue amplifiers. A first detector detects the levels of the red, green and blue video signals and a second detector detects the illuminance level of the video image. A controller controls the relative gains of the red, green and blue amplifiers in accordance with the first and second detector.

11 Claims, 3 Drawing Sheets

APPARATUS AND METHOD FOR ADJUSTING WHITE BALANCE OF A VIDEO CAMERA

BACKGROUND

1. Field of the Invention

This invention relates generally to video cameras. More particularly, the invention relates to a method and apparatus for white balancing a color video camera.

2. Background of the Invention

When white balance is not correctly adjusted in a color video camera, the image taken by the color video camera may have reddish or bluish hue. Therefore, adjustment of white balance is very important.

There are several ways to obtain white balance data necessary to perform a white balancing process. In a first technique, the video signal is integrated over one whole image. In a second technique, the image is divided into plural regions and the video signal in each region is respectively integrated. In a third technique, the brightest portion (presumed to be a white object) in an image is detected. Adjustment of white balance is done based on the data obtained by the above described methods.

However, under the first method, when an image includes a large colored object like a uniformly green lawn, the adjustment of white balance includes adjustment error due to the effects of the large colored object. Under the second method, if there are no white objects in the regions, adjustment error can occur. Under the third method, if the image includes a TV screen, outdoor light from a window or bright sunlight at sunset, error can also be introduced into the white balance adjustment. When an image includes both bright sunlight and shade at the same time, the blue of shade is emphasized too much because the adjustment tends to make the bright sunlight portion white.

SUMMARY OF THE INVENTION

It is an object of the present invention to provide an improved white balance in a color video camera.

It is a feature that the present invention to provides accurate white balance over a wide range of image conditions.

These and other objects, advantages and features of the invention will become apparent to those skilled in the art upon consideration of the following description of the invention.

In one embodiment of the present invention, a white balance adjustment apparatus for a color video camera includes an image pick-up picks up a video image and producing first, second and third video signals. A first amplifier amplifies the first video signal, a second amplifier amplifies the second video signal and a third amplifier for amplifies the third video signal. A first detector detects levels of the first, second and third video signals respectively. A second detector detects the illuminance level of the video image. A controller controls relative gains of the first, second and third amplifiers according to the first and second detector.

In a method of the present invention, a method for establishing white balance for an image in a color video camera, includes the steps of: measuring a value of illuminance of the image; determining that the image is an outdoor image if the illuminance is more than approximately 800 lux; determining that the image is an indoor image if the illuminance is less than approximately 500 lux; determining that the image is the same as a previous image if the illuminance is between the indoor threshold and the outdoor threshold; computing a first white balance value for a high illuminance portion of the image and for computing a second white balance value for a low illuminance portion of the image; selecting the one of the first and second white balance values which is closest to a current white balance value if the image is determined to be an indoor image; selecting the one of the first and second white balance values which is closest to a preset outdoor white balance value if the image is determined to be an outdoor image and if both of the first and second white balance values are either lower or higher than the preset outdoor white balance value; selecting the one of the first and second white balance values which is closest to a preset outdoor white balance value if the image is determined to be an outdoor image and if one of the first and second white balance values is lower and one is higher than the preset outdoor white balance value; and selecting the one of the first and second white balance values which is closest to a preset outdoor white balance value if the image is determined to be an outdoor image and if both of the first and second white balance values are sufficiently close to the preset outdoor white balance value.

Another method for establishing white balance for an image in a color video camera, includes the steps of: measuring a value of illuminance of the image; determining that the image is an outdoor image if the illuminance is more than a predetermined outdoor threshold; determining that the image is an indoor image if the illuminance is less than a predetermined indoor threshold; and determining that the image is the same as a previous image if the illuminance is between the indoor threshold and the outdoor threshold.

In a white balance adjustment circuit according to the present invention, Red, green and blue signals are passed through red, green and blue amplifiers. A first detector detects levels of the red, green and blue video signals respectively. A second detector detects the illuminance level of the video image. A controller controls the relative gains of the red, green and blue amplifiers according to said first and second detector.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DESCRIPTION OF THE INVENTION

Figure 1:
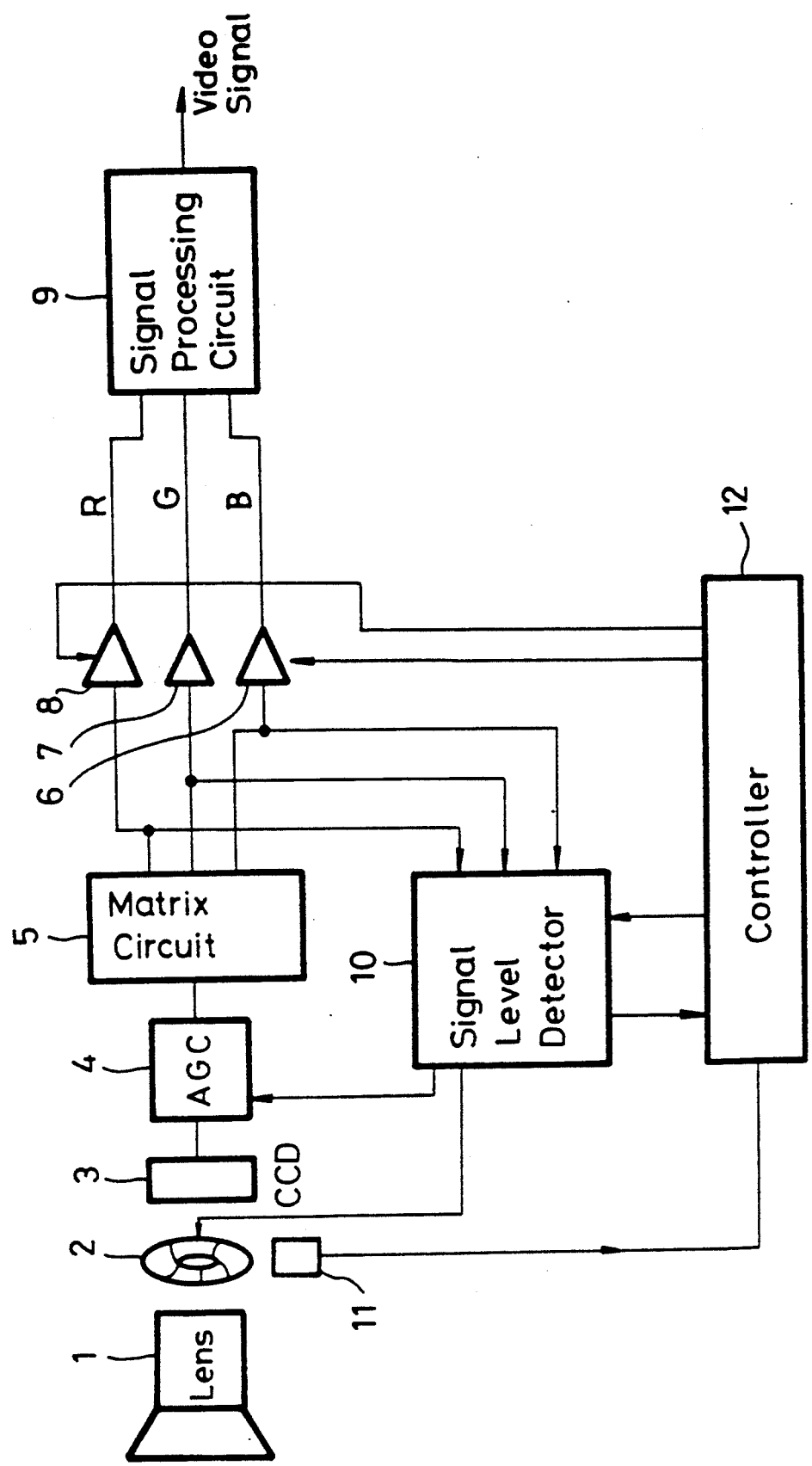
FIG. 1 is a block diagram of a first embodiment of the present invention.

Referring now to the drawings, and in particular to FIG. 1, there is illustrated a block diagram of a white balance circuit of a color video camera. In this embodiment, 1 is a lens for receiving an optical image from an object. Two is a iris controlled by a signal level detector described hereinafter for varying exposure of an optical image from the lens 1. Three is an image pick-up device such as a CCD (charge coupled device.) Four is an automatic gain control circuit (AGC) controlled by a signal level detector 10 described hereinafter for amplifying output signals from the image pick-up device. Five is a matrix circuit for separating an output of the AGC 4 into R (red), G (green) and B (blue) color signals. Six, seven and eight are white balance amplifiers supplied with the R, G and B color signals, respectively. The gain of the white balance amplifier 7, supplied with the color signal G, is maintained at a predetermined level.

The gain of the white balance amplifiers 6 and 8 are controlled by a microprocessor based controller 12 described hereinafter. Nine is a signal processing circuit for generating a video signal. The signal level detector 10 described above includes a wave detector. The signal level detector 10 integrates each amplitude level of the color signals R, G, B when an amplitude level of the color signal G is within a predetermined range. In this case, a luminance signal can be used instead of the color signal G. Color difference signals can be used instead of color signals R and B. The predetermined range of the amplitude of color signal G is set up by the microprocessor 12. Eleven is a sensor for detecting position of the iris 2 and for outputting position data to the micro processor 12.

The position data is used by the microprocessor 12 to represent how much light can pass through the iris 2. As position sensor 11, a hall effect device may be used, for example. Other position sensing mechanisms may equally well be used. Twelve is a microprocessor for calculating the most suitable white balance control data in accordance with the output of the signal level detector and the position data of the iris 2.

Figure 3:
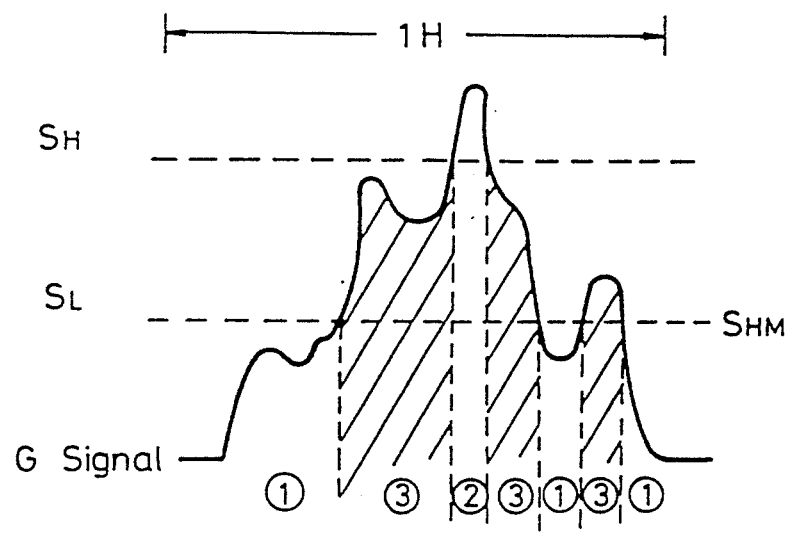
FIG. 3 is an illustration of the slice levels used in the present invention.

Referring to FIG. 3, a calculating method for white balance data in microprocessor is described hereinafter. FIG. 3 represents the color signal G within a duration of one horizontal scanning period. $S_H$ and $S_L$ are upper and lower slice levels of a limiter (not shown) set up by the microprocessor 12, respectively. For example, the limiter is established in the signal level detector 10. When the amplitude level of the color signal G is more than $S_H$ or less than $S_L$, the microprocessor 12 controls the signal level detector 10 to inhibit each integrating operation of the amplitude levels of the color signals R, G, B.

Namely, integration is inhibited in the marked areas 1 and 2 in FIG. 3. When the amplitude level of the color signal G is between $S_L$ and $S_H$, the microprocessor 12 controls the signal level detector 10 to carry out each integrating operation of the amplitude levels of the color signals R, G, B. Referring to FIG. 3, the areas shaded with oblique lines are integrated. Then, the amplitude level of each color signal is integrated in the signal level detector 10, and integrating data is output to the microprocessor 12. The microprocessor 12 changes the upper and lower limits of the slice levels $S_H$, $S_L$ respectively, to generate two sets of integrating data which are described hereinafter.

High Luminance Portion

The upper limit $S_H$ is set up to eliminate a saturated part of the output of the image pick up device. This is because accurate color information is not included in the saturated part of the outputs of the image pick up device.

The lower limit $S_L$ is set up at about 5% to 10% of the integral value of one whole image where $S_L$ is zero. As explained above, the integral value for the high luminance portion is based on the integral calculation of the color signals where the color signals are between the upper and lower limits, $S_H$ and $S_L$.

Middle Luminance Portion

The upper limit $S_{HM}$ is set up to the lower level $S_L$ which is set up in high luminance portion. The lower limit $S_{LM}$ is set up to zero. Namely, except for the high luminance portions described above ($S_H \sim S_L$), the signal level detector 10 integrates the amplitude level of each color signal R, G, B so as to obtain a integrated value of middle luminance portions.

According to this embodiment, a method for obtaining the most suitable white balance data is described as follows. The microprocessor 12 generates the most suitable white balance control data $D_H$ and $D_M$ in accordance with the integrated values of the high luminance portion and middle luminance portion of the color signals R, G and B respectively. Moreover, the microprocessor 12 sets up white balance data $D_S$ corresponding to the previous color temperature of outdoors. The white balance data $D_S$ are compared to white balance data $D_H$, $D_M$. For example, the white balance data $D_S$ is set at a color temperature of about 5800±500 K.

Figure 4:
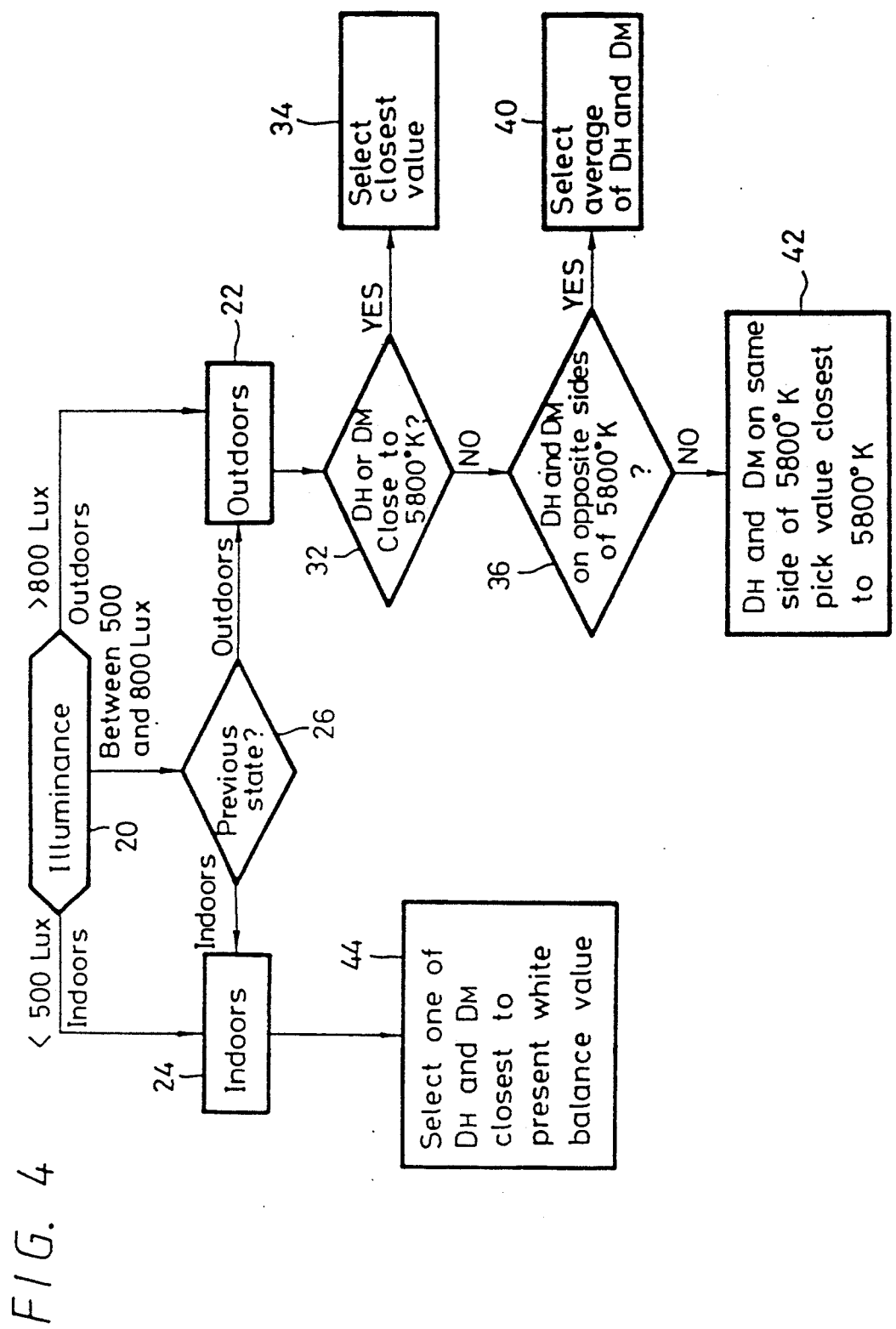
FIG. 4 is a flow chart of the white balance method of the present invention.

Microprocessor 12 determines whether it is outdoors or indoors, based upon the position information of the iris which corresponds to the surrounding illuminance. This process is illustrated in FIG. 4. For example, microprocessor 12 inspects the position of the iris to determine an illumination value at step 20. It determines that it is an outdoor image at step 22 when the illuminance is more than a particular threshold, e.g., 800 lux. It determines, at step 24, that it is an indoor image when the illuminance value is less than a second threshold, e.g., 500 lux. It determines that it is same as before (outdoor or indoor) at step 26 when in between these values.

If the image is determined by the above process to be an outdoor image, that is an image illuminated by sunlight, microprocessor 12 carries out the following process. Those skilled in the art will appreciate that the order of the steps below may be interchanged without departing from the invention.

1. When white balance control data $D_H$ and/or $D_M$ is near the color temperature 5800 K at step 30, the process chooses the white balance control data which is closer to the color temperature at step 34. 5800 K is used because the color temperature 5800 K is the center of color temperature outdoors. If the data obtained is near the color temperature 5800 K, it is very probable that the image is an outdoor image.

2. When white balance control data $D_H$ and $D_M$ are at both sides of the color temperature 5800 K (except when condition 1 is satisfied) at step 36, it is highly probable that the video camera is shooting a mixed scene. For example, the scene could include bright sunlight having low color temperature and shade having high color temperature (for example, at sunset on a fine day) or a mixture scene of blue sky and red ground. Therefore, if one of white balance control data $D_H$ and $D_M$ is selected and used, the resulting image will be too red or too blue. To avoid this result, an average of $D_H$ and $D_M$ is used as white balance data at step 40.

3. When both white balance control data $D_H$ and $D_M$ are on the same side of the color temperature 5800 K at step 36, the video camera is very likely to be shooting either a shade scene or bright sunlight scene having low color temperature. In this case, the one of the white balance control data $D_H$ and $D_M$ which is closer to the color temperature 5800 K is selected as a white balance data at step 42.

On the other hand, if the microprocessor 12 determines that it is an indoor scene based upon the illuminance values according to the process above at step 24, it selects one of white balance control data $D_H$ and $D_M$ which is closer to the present white balance data at step 44.

In the above described system, white balance data are obtained based on the shot image. Therefore, if the image includes a large colored object or very bright object with color temperature different from the surrounding one (like a TV screen), the camera is not adversely affected. Even if bright sunlight and shade co-exist in one image, optimum white balance can be obtained.

Figure 2:
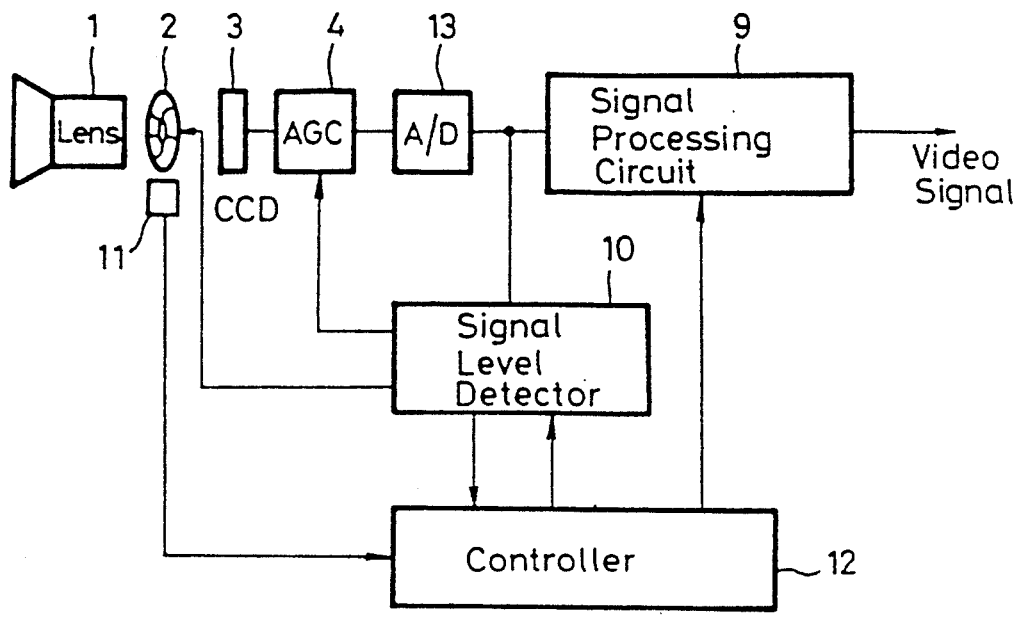
FIG. 2 is a block diagram of a second embodiment of the invention.

FIG. 2 shows another embodiment according to the present invention. In this second embodiment, the present invention is applied to a digital video camera. In FIG. 2, elements common to FIG. 1 have same reference numbers and explanation of those elements will be omitted.

In FIG. 2, an image of an object passes through lens 1 and iris 2 for controlling exposure and is focused on a surface of an image sensor 3. The output of image sensor 3 is amplified by automatic gain control amplifier 4 and then converted to a digital signal by analog-to-digital converter 13. The output of analog-to-digital converter 13 is supplied to a signal processing circuit 9 which produces a video signal in a desired form. The output of analog-to-digital converter 13 is also sent to a signal level detector 10 which integrates each color video signal R, G and B respectively. This integration calculation is controlled by a microprocessor 12. The calculation is done based on the luminance level as done in the first embodiment. The integral values of each color video signal are then sent to microprocessor 12.

Sensor 11 sends position information of iris 2 to microprocessor 12. Microprocessor 12 calculates the optimum white balance data according to the integral values of each color video signal and the position information of iris 2. This calculation of the optimum white balance data is the same as shown in the first embodiment. Finally, microprocessor 12 controls signal processing circuit 9 according to the optimum white balance data so that proper white balance is achieved by signal processing circuit 9.

A variety of modifications are possible to which the present invention, and thus the invention is not limited to these particular embodiments shown in this specification.

What is claimed is:

1. A white balance adjustment apparatus for a color video camera, comprising:
    image pick-up means for picking up a video image and producing first, second and third video signals;
    a first amplifier for amplifying said first video signal;
    a second amplifier for amplifying said second video signal;
    a third amplifier for amplifying said third video signal;
    first detecting means for detecting levels of said first, second and third video signals respectively;
    second detecting means for detecting illuminance level of said video image;
    controlling means for controlling gains of said first and third amplifiers according to said first and second detecting means;
    said first detecting means detects two types of integration values of each of said first, second and third video signals, a first integration value for signals with a high illuminance level which is greater than a pre-determined illuminance level and a second integration value for signals with a low illuminance level which is less than said pre-determined illuminance level;
    said first detecting means further provides a first threshold level and a second threshold level which is lower than said first threshold level;
    said first integration value is the integration of each of said video signals whose levels are between said first and second threshold levels;
    said second integration value is the integration of each of said video signals whose levels are lower than said second threshold level;
    said controlling means provides first and second white balance data based on said first and second integration values and compares said first and second white balance data with a pre-set white balance data which corresponds to a color temperature of an outdoor environment;
    said second detecting means detects whether said video image is outdoors;
    said controlling means uses one of said first and second white balance data which is nearest to said pre-set white balance data where said pre-set white balance data is higher or lower than both of said first and second white balance data, said controlling means uses an average of said first and second white balance data when said pre-set white balance data is between said first and second white balance data except where one of said first or second white balance data is within a pre-determined range from said pre-set white balance data, in which case the white balance data is used; and
    said second detecting means further detects that said video image is indoors said controlling means uses the one of either said first or second white balance data which is closest to a then current white balance data.

2. A white balance adjustment apparatus according to claim 1, wherein said first, second and third video include red, green and blue video signals respectively.

3. A method for establishing white balance for an image in a color video camera, comprising the steps of:
    measuring a value of illuminance of said image;
    determining that said image is an outdoor image if said illuminance is more than a predetermined outdoor threshold;
    determining that said image is an indoor image if said illuminance is less than a predetermined indoor threshold; and
    determining that said image is the same as a previous image if said illuminance is between said indoor threshold and said outdoor threshold.

4. The method of claim 3, wherein said outdoor threshold is approximately 800 lux.

5. The method of claim 3, wherein said indoor threshold is approximately 500 lux.

6. The method of claim 3, further comprising the step of computing a first white balance value for a high illuminance portion of said image and for computing a second white balance value for a low illuminance portion of said image.

7. The method of claim 6, further comprising the step of selecting the one of said first and second white balance values which is closest to a current white balance value if said image is determined to be an indoor image.

8. The method of claim 6, further comprising the step of selecting the one of said first and second white balance values which is closest to a preset outdoor white balance value if said image is determined to be an outdoor image and if both of said first and second white balance values are either lower or higher than said preset outdoor white balance value.

9. The method of claim 6, further comprising the step of selecting the one of said first and second white balance values which is closest to a preset outdoor white balance value if said image is determined to be an outdoor image and if one of said first and second white balance values is lower and one is higher than said preset outdoor white balance value.

10. The method of claim 6, further comprising the step of selecting the one of said first and second white balance values which is closest to a preset outdoor white balance value if said image is determined to be an outdoor image and if both of said first and second white balance values are sufficiently close to said preset outdoor white balance value.

11. A method for establishing white balance for an image in a color video camera, comprising the steps of:
measuring a value of illuminance of said image;
determining that said image is an outdoor image if said illuminance is more than an outdoor threshold of approximately 800 lux;
determining that said image is an indoor image if said illuminance is less than an indoor threshold of approximately 500 lux;
determining that said image is the same as a previous image if said illuminance is between said indoor threshold and said outdoor threshold;
computing a first white balance value for a high illumination portion of said image and for computing a second white balance value for a low illuminance portion of said image;
selecting the one of said first and second white balance values which is closest to a current white balance value if said image is determined to be an indoor image;
selecting the one of said first and second white balance values which is closest to a preset outdoor white balance value if said image is determined to be an outdoor image and if both of said first and second white balance values are either lower or higher than said present outdoor white balance value;
selecting the one of said first and second white balance values which is closest to a preset outdoor white balance value if said image is determined to be an outdoor image and if one of said first and second white balance values is lower and one is higher than said preset outdoor white balance value; and
selecting the one of said first and second white balance values which is closest to a preset outdoor white balance value if said image is determined to be an outdoor image and if both of said first and second white balance values are sufficiently close to said preset outdoor white balance value.

* * * * *